No. 625,875. Patented May 30, 1899.
W. DAVES.
ELECTRICALLY CONTROLLED AND OPERATED RAILWAY SIGNAL.
(Application filed Dec. 12, 1898.)

(No Model.) 7 Sheets—Sheet 1.

Fig. 1

WITNESSES:

INVENTOR
William Daves,
BY J. M. Yznaga
ATTORNEY.

No. 625,875. Patented May 30, 1899.
W. DAVES.
ELECTRICALLY CONTROLLED AND OPERATED RAILWAY SIGNAL.
(Application filed Dec. 12, 1898.)
(No Model.) 7 Sheets—Sheet 2.

Fig. 2.

Witnesses
Franck L. Ourand.
A. G. Heysinger.

Inventor
William Daves.
By J. M. Yznaga.
Attorney

No. 625,875. Patented May 30, 1899.
W. DAVES.
ELECTRICALLY CONTROLLED AND OPERATED RAILWAY SIGNAL.
(Application filed Dec. 12, 1898.)
(No Model.) 7 Sheets—Sheet 3.

Fig. 3.

WITNESSES:
Franck L. Onrand.
A. G. Heysmun.

INVENTOR
William Daves
BY J. M. Yznaga.
ATTORNEY.

No. 625,875. Patented May 30, 1899.
W. DAVES.
ELECTRICALLY CONTROLLED AND OPERATED RAILWAY SIGNAL.
(Application filed Dec. 12, 1898.)

(No Model.) 7 Sheets—Sheet 4.

Witnesses
F. L. Ourand
A. G. Heyfmann

Inventor
William Daves,
by J. M. Yznaga,
Attorney

No. 625,875. Patented May 30, 1899.
W. DAVES.
ELECTRICALLY CONTROLLED AND OPERATED RAILWAY SIGNAL.
(Application filed Dec. 12, 1898.)
(No Model.) 7 Sheets—Sheet 6.

WITNESSES:
INVENTOR
William Daves,
BY J. M. Yznaga,
ATTORNEY.

No. 625,875. Patented May 30, 1899.
W. DAVES.
ELECTRICALLY CONTROLLED AND OPERATED RAILWAY SIGNAL.
(Application filed Dec. 12, 1898.)
(No Model.) 7 Sheets—Sheet 7.

WITNESSES:

INVENTOR
William Daves,
BY
J. M. Yznaga.
ATTORNEY:

UNITED STATES PATENT OFFICE.

WILLIAM DAVES, OF JERSEY CITY, NEW JERSEY.

ELECTRICALLY CONTROLLED AND OPERATED RAILWAY-SIGNAL.

SPECIFICATION forming part of Letters Patent No. 625,875, dated May 30, 1899.

Application filed December 12, 1898. Serial No. 699,036. (No model.)

*To all whom it may concern:*

Be it known that I, WILLIAM DAVES, a citizen of the United States of America, residing in Jersey City, in the county of Hudson and State of New Jersey, have invented certain new and useful Improvements in Electrically Controlled and Operated Railway-Signals; and I do hereby declare the following to be a full, clear, and exact description of the invention, such as will enable others skilled in the art to which it appertains to make and use the same.

My invention has relation to improvements in electrically operated and controlled railway-signals; and the object is to improve and render certain and more efficient the mechanism which determines the period of operation of the motor which operates the signal-movement from danger to safety position by interposing an electrically-controlled time-circuit mechanism in the motor-circuit, whereby the motor-circuit is opened and closed and the action of the motor is determined for a time necessary only to complete the movement of the signal from "danger" to "safety." This object I accomplish by interposing an electrically operated and controlled time-circuit mechanism to make and break the motor-circuit and to keep the motor-circuit at all times, except for a short period of time—usually about five seconds—open while the signal is moved by the operation of the motor from "danger" to "safety." I also design or purpose to accomplish the restoration of the battery of the motor-circuit, should it become partially exhausted, depleted, or inefficient by constant or closely-repeated requisition in operations of the signal, by breaking the signal or motor circuit at a determined time whether the movement of the signal from "danger" to "safety" has been completed or not, so that the battery of the motor-circuit will be speedily restored to its normal force.

In my former and earlier Letters Patent, No. 564,683, dated July 28, 1896, for an electric railway-signal, the time mechanism is set by the movement of the signal-operating rack-bar and operated to break the motor-circuit by spring-operated mechanism. This has proved generally competent and effective; but in instances of recurring operations at short intervals the motor-battery becomes exhausted and temporarily polarized, and this condition may arise at a moment when the signal is moved partially from "danger" to "safety" and there hang, with the time mechanism not set for action and the circuit unbroken and constant, so that the battery is not at rest to acquire restoration. My present invention, however, being interposed in the circuits, operates independently of the power essential to operate the signal and accomplishes the opening or closing of the motor-circuit, and thus affords rest to the battery, so that its speedy restoration and active force ensue.

I accomplish the objects and purposes of my invention by the means, appliances, and instrumentalities illustrated in the accompanying drawings, wherein—

Primarily my invention consists in the interposition or introduction of an electrically operating and controlled time-circuit mechanism in the motor-circuit, whereby the motor-circuit is opened and closed for a definite and determined time, and consisting of a magnet controlling a locking-pawl, a rotary wheel engaged by the pawl, a magnet intermittently operating the armature, and a retaining-pawl operated by the operating-pawl to prevent the ratchet-wheel from being rotated beyond the throw of the operating-pawl.

The preferred form and construction of my time-circuit opening and closing mechanism are fully illustrated in the drawings from Figs. 1 to 6, both included, and reference being thereto had, and taken in connection with the following description of the parts, elements, and mechanism, the invention will be clearly understood.

A designates a substantial metal frame of such proportion, shape, and design as will adapt it to the purposes of receiving and holding the operative mechanism embodied in my invention. In the present instance the frame or casing consists of a metal base-plate 1, a vertical plate 2, integral therewith, and an overhanging plate 3, placed parallel with the bottom plate or base-plate 1 and of the same area, and a standard or bar 4, having the ends connected and detachably secured to the base and overhanging plate, substantially as shown in the drawings. At a proper point in the overhanging top plate 3 of the frame is rigidly secured a vertically-depending arm or hanger 5, in the lower end of which one end of the time-wheel shaft or arbor 6 is supported and journaled on a conical bearing-pin 7, let in a suitable seat formed in the depending hanger. The other or outer end of the time-wheel arbor is mounted on a conical bearing-pin 8, let through the vertical standard 4, and both bearing-pins being threaded in their seats in order to be adjusted to and from their bearings in the ends of the arbor and locked in adjusted and proper position by jam-nuts, as 9. On the arbor or shaft of the time-wheel is mounted to turn therewith the time-wheel B. This time-wheel is formed with ratchets 10 on its circumferential edge, the direction of the ratchets being to the right, to be engaged by the pawl which rotates it while the motor-circuit is closed and the signal is passing from safety to danger position. To one of the arms of the time-wheel is pivotally hung a weight 11, which serves to speedily and with certainty return the wheel to initial position after having been turned to its limit and the track-circuit is restored. To the time-wheel B is secured a ratchet-wheel C of equal diameter to the wheel B and which has its ratchets in reverse direction to those of the time-wheel B, as shown in the drawings, the purpose being that the ratchets of the wheel or ring C shall be engaged by the pawl or lug of the lever operated by the operating-pawl, as will be more particularly specified hereinafter. On the ratchet-ring C are formed or secured two stop-lugs 12 $12^\times$, the former of which stops the rotation of the time-wheel by lodging or impacting against the edge of the depending hanger 5 and the latter in a similar manner lodging against the opposite edge of the hanger when the circuit is opened and the weight returns the time-wheel to its normal position to again open the circuit.

Figure 1:
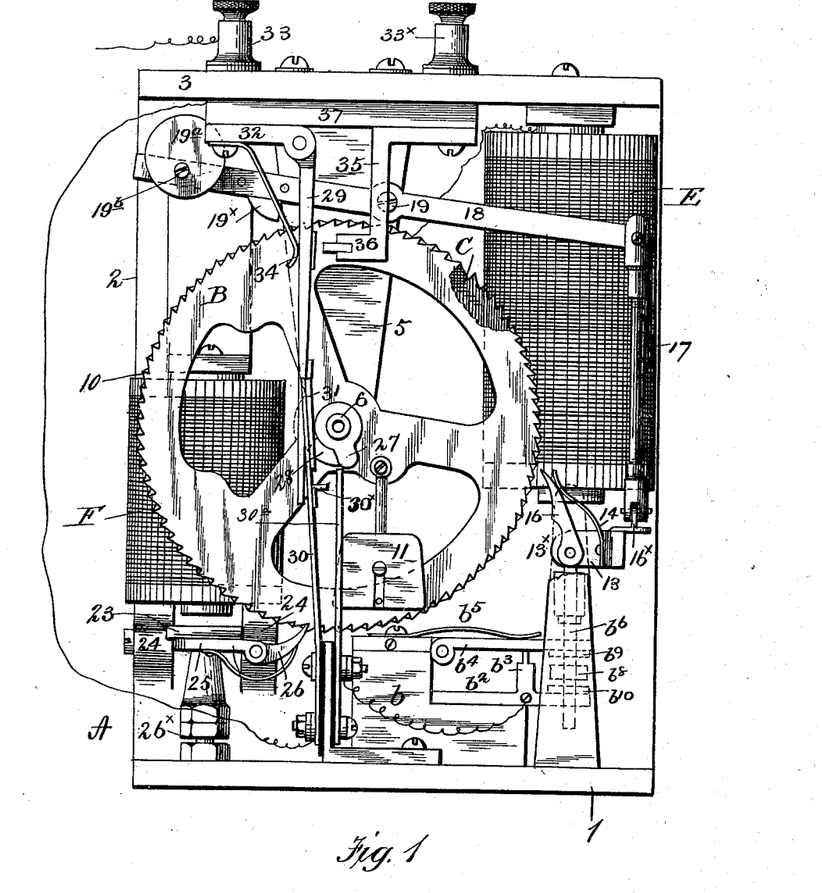
Figure 1 is a side elevation of my improved time-circuit device, showing the spring contact bars or rods, the rotary ratchet-wheel with cams to break the contacts, weight to return the wheel to normal position, the locking-pawl, and the time-wheel-operating pawl.
Figure 2:
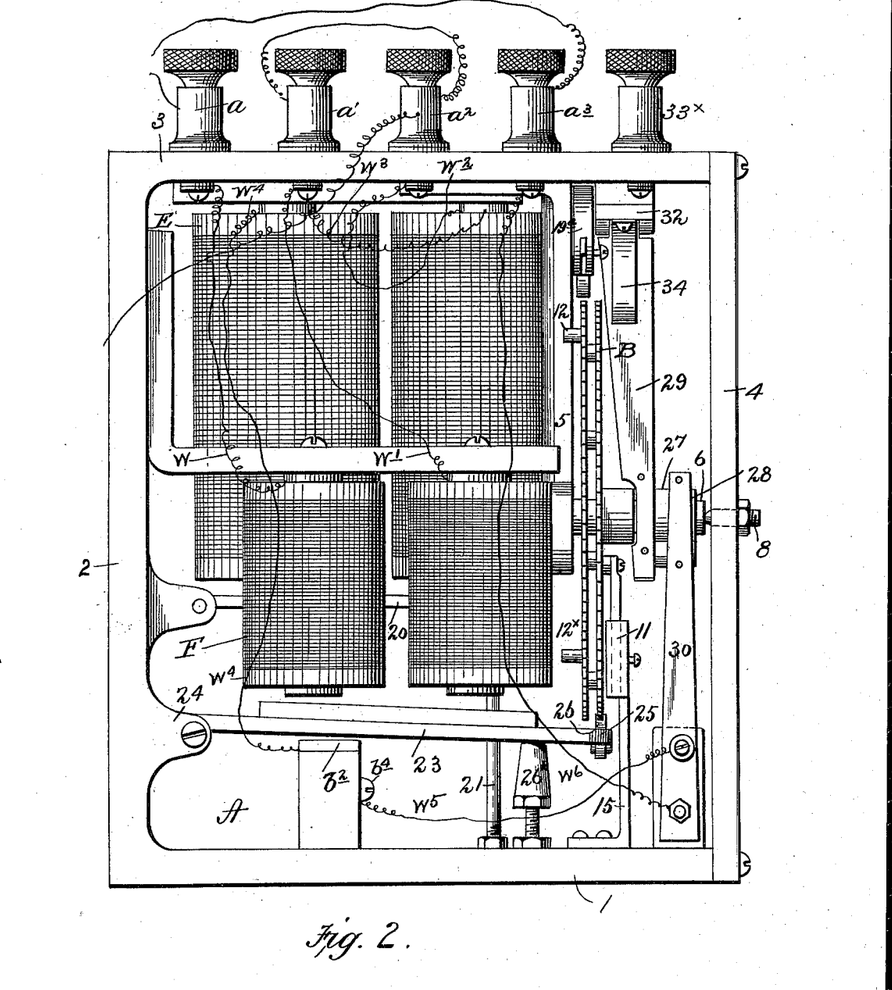
Fig. 2 is an elevation looking from the left of Fig. 1, showing the contact-springs and the two ratchet-wheels.
Figure 3:
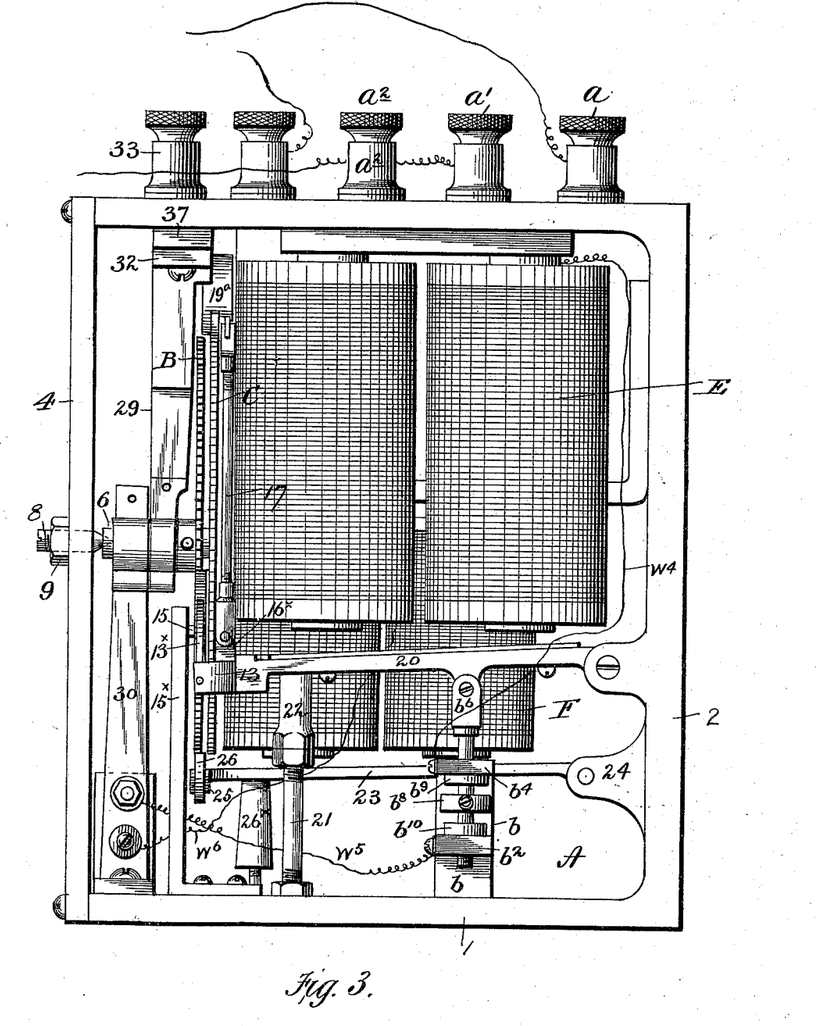
Fig. 3 is an end elevation looking from the right of Fig. 1.
Figure 4:
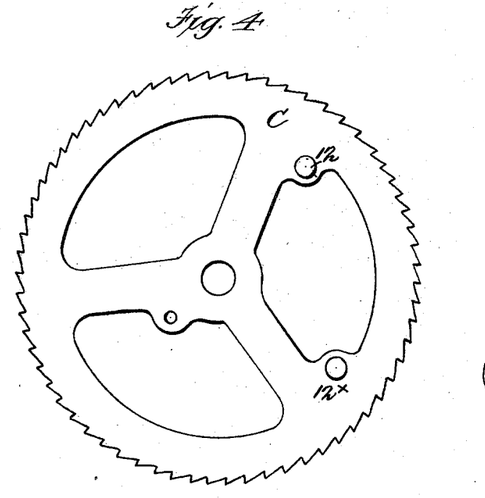
Fig. 4 is a detail view of the time-operating ratchet-wheel, showing the stop-lugs for limiting and stopping the rotations of the ratchet time-wheel.

The time-wheel mechanism consists of the following-described elements: To an extension, arm, or lug 13 of the armature 20 of the electromagnets E is pivotally mounted a vertically-arranged pawl $13^\times$, the free end of which intermittingly engages in the teeth of the time-wheel B and in its upward movement and engagement therewith rotates the time-wheel the distance of one tooth, a spring 14 bearing on the pawl to accomplish and maintain the engagement. When the pawl has moved the time-wheel one tooth, or the distance of the stroke imparted by the upward movement of the armature, it is relieved by the opening of the circuit which moved it in that direction and the armature 20 drops by gravity away from the magnet E and the pawl carried away from and free from the wheel by means of a pin 15, projecting in the path of a cam extension 16 on the under side or face of the pawl, the said pin 15 being secured in the upper end of a standard $15^\times$, suitably mounted and secured to the frame, substantially as shown in the drawings. To a lug $16^\times$ on the arm 13 is suitably mounted and secured the lower end of a vertically-disposed rod 17, the upper end of which is pivotally connected to a rod 18, fulcrumed, as at 19, to a proper support and formed or provided with a stop-lug $19^\times$, adapted to engage in the teeth of the ratchet wheel or ring C, the object or purpose being that when the operating-pawl moves the time-wheel to the limit of its stroke this lug $19^\times$ will be moved into engagement with the teeth of the ratchet-ring and lock the time-wheel from being thrown a greater distance than the movement of the operating-pawl, which might be the case if no stop-lug were provided. The rod 18 is extended beyond the stop-lug $19^\times$, and on the extension is adjustably arranged a weight $19^a$, which may be set in any position to which moved by a set-screw $19^b$ in a well-known manner. The purpose of this weight is to assist the force of the armature and operating-pawl in their upward functions and duty of turning the time-wheel.

The grip or locking magnet G, with locking-armature engaging a drum on the motor-shaft, is identical in construction and operation with the device for this purpose shown and described fully in my former-cited Letters Patent, No. 564,688, the drum being loosely mounted on the motor-shaft and held against rotation in one direction by a pawl and ratchet, so that when the armature is drawn down on the poles of the magnet the drum will be held against rotation and the motor be locked when the signal is at safety position until the drum is released by the upward movement of the armature. In the brake or grip circuit associated with this grip-magnet and armature which locks the motor, so that it may be reversed by the movement of the signal while it moves by gravity or action of the weighted arm of the signal from "safety" to "danger," is a pair of electromagnets E, the poles of which are operatively adjacent to the armature 20, carrying the operating-pawl $13^\times$, intermittingly operated by the make-and-break contact in the circuit below the armature, substantially as shown, the downward movement of the armature being limited, regulated, or adjusted by means of a two-part standard, consisting of a lower post 21, screw-threaded at its upper portion, and an upper portion 22, having a screw-threaded socket in which the post engages and whereby the portion 22 may be adjusted vertically to limit the downward movement of the armature.

Figures 6, 7, 8:
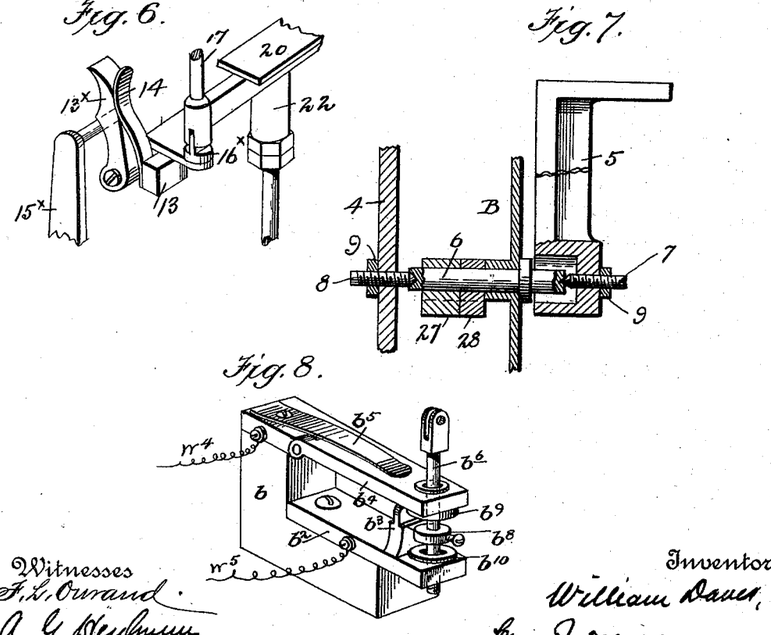
Fig. 6 is a detail of the operating time-pawl and post with clearing-pin to move the pawl outward and away from the ratchet-wheel when the armature by which it is carried is free from the magnets.
Fig. 7 is a detail view, partly in section, showing the bearings of the time-wheel arbor.
Fig. 8 is a detail perspective of the make-and-break mechanism.

The make-and-break device or mechanism above referred to and illustrated in Fig. 8 of the drawings consists of a suitable non-conducting support $b$, having secured thereto a brass plate $b^2$ with a vertical contact-lug $b^3$, which constitute the lower element of the device. To the step on the support $b$ is hinged a brass plate $b^4$, normally held in contact with the contact-lug $b^3$ by a spring $b^5$. To the armature 20 is pivotally jointed and hung a depending rod $b^6$, which is projected through insulated apertures $b^7$ in the plates $b^2$ and $b^4$. The rod $b^6$ is threaded, and thereon is a nut $b^8$, which moves between two insulating pads or blocks $b^9$ $b^{10}$ on the faces of each brass plate. It will now be perceived that when the armature 20 is drawn up to the magnet the contact of the plates $b^2$ $b^4$ ($c^2$) will be opened and any circuit through them broken.

Figure 5:
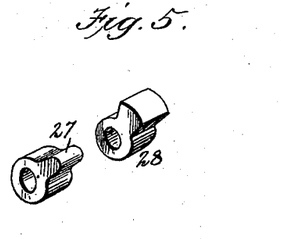
Fig. 5 is a detail view of the two cams on the arbor or shaft of the ratchet-wheel.

To lock the time-wheel in the position to which it may be moved and to hold it against return in any position to which it may be moved during its rotary progression from its normal or initial position, an electromagnet F is placed and coupled in the motor-grip circuit, the poles of which magnet F are operatively adjacent to an armature 23, pivotally mounted at its inner end in ears or bearing-lugs 24, formed on or secured to the vertical wall of the frame, as indicated, and on the outer end of the armature 23 is an arm 25, carrying in its free end a pawl 26, pivotally mounted, which is arranged to engage with its free end in the ratchets of the time-wheel and hold it against return to initial point until the pawl is released by the release and descent of the armature. To limit the downward movement of the armature 23, a vertically-adjustable post $26^\times$ is set in the path of the armature and suitably secured in the bed-plate of the frame. On the arbor of the time-wheel are secured two cam-lugs 27 28, arranged side by side, as shown in Fig. 5 of the drawings, the former, 27, engaging with a contact-arm 29, to break the motor-circuit a little in advance of the contact of the latter, 28, with a contact-arm 30 in the relay and grip circuits, so that the motor-circuit in progression of the time-wheel will be opened a period or step before the grip and relay circuits are. On the reversal of the time-wheel and the return thereof to normal position the cams produce the same effects, the circuits being closed only for the time the time-wheel is returning to the initial point. The contact bar or piece 29 consists of a flat strip of brass having suitably secured to its face which contacts with the cam 27 a plate 31, of suitable insulating material, as indicated, and at the upper end the bar is jointed or hinged to a plate 32, connected to the binding-post 33 in the motor-circuit, and the bar is pressed into engagement or contact with its contact mate and kept in contact with the cam by a spring 34, bearing with its free end against the outer face of the bar. The other contact-piece 35 consists of an L-shaped bracket formed with a lug 36 set in the path of the hinged contact-arm and is connected to the binding-post $33^\times$ in the motor-circuit. A suitable insulating-plate 37 is interposed between the contacts for separation and isolation from the frame.

It will be perceived that when the contacts 29 and 35 are standing open the motor-circuit will also be open, and of course when these elements are in contact the motor-circuit will be closed. The result is that the motor-circuit is not called into operation and activity except when the signal is being moved from safety to danger position, so that the motor-battery is inactive except when in actual use and stands open at all other times. The contact-arm 30 consists of a vertically-arranged spring-metal strip formed with a contact-lug $30^\times$, which contacts with a vertical contact-piece $30^a$ to open and close the relay and grip circuits, as shown in Fig. 1 of the drawings.

The electromagnets F are coupled to the binding-posts $a$ $a'$, the former being directly in the grip-circuit and the latter being coupled to the binding-post $a^2$ in the relay-circuit, the connections to the poles of the magnet being made by wires $w$ $w'$ from the binding-posts $a$ $a'$. The binding-post $a^2$ is coupled to the magnet E by wire $w^2$, and wire $w^3$ couples the poles of this magnet. From one pole of magnet E leads wire $w^4$, the other end of which is secured to the upper plate $b^2$ of the make-and-break device, connection from the other plate $b^4$ of the device being made by wire $w^5$ to the base of contact-piece 30, and wire $w^6$ from the base of contact-piece 30 is carried up and secured to binding-post $a^3$ in the relay-circuit. It will be perceived that this device may be coupled up or interposed in the motor-circuit at any point convenient, adjacent, or remote from the motor and signal.

Figure 9:
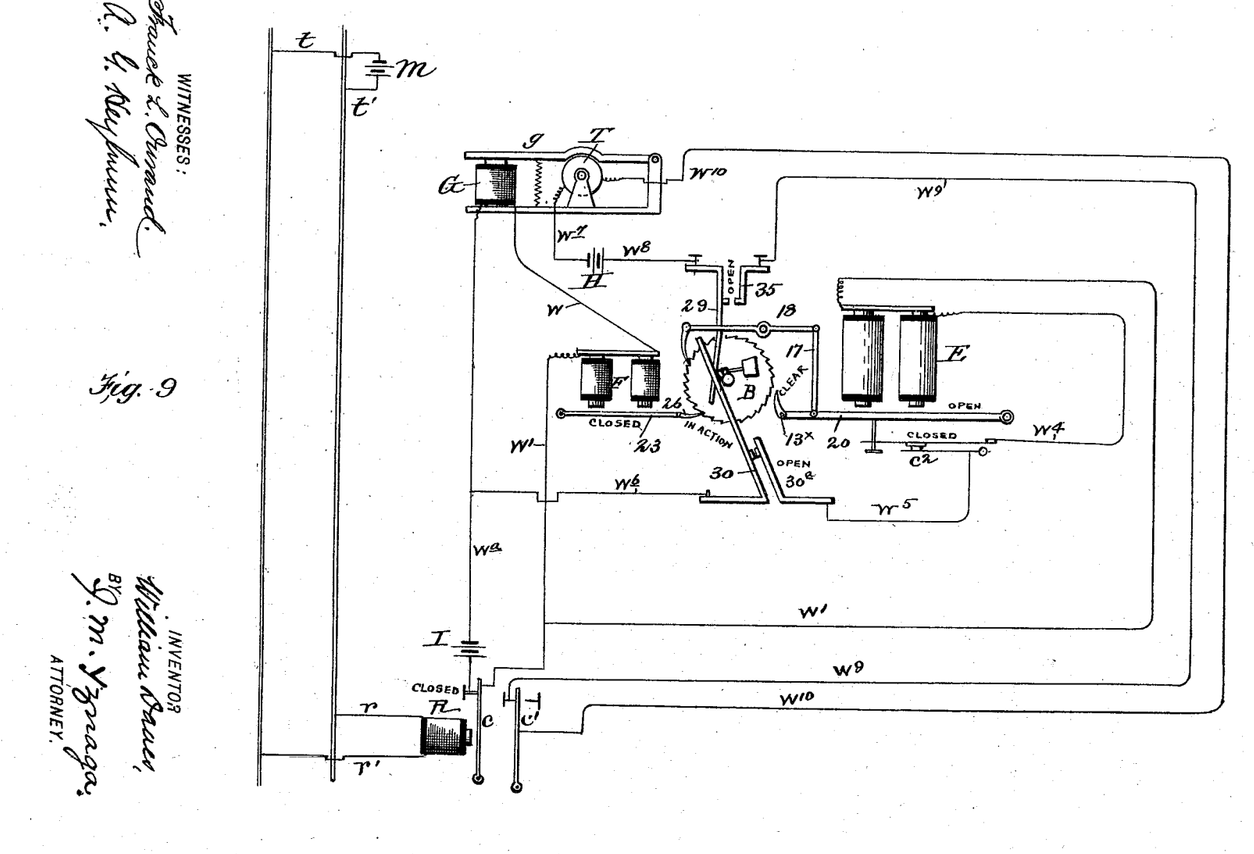
Fig. 9 is a diagrammatic view showing the relation and condition of the circuits and interposed elements and mechanism when the track is clear and the signal is in its usual position of safety.
Figure 10:
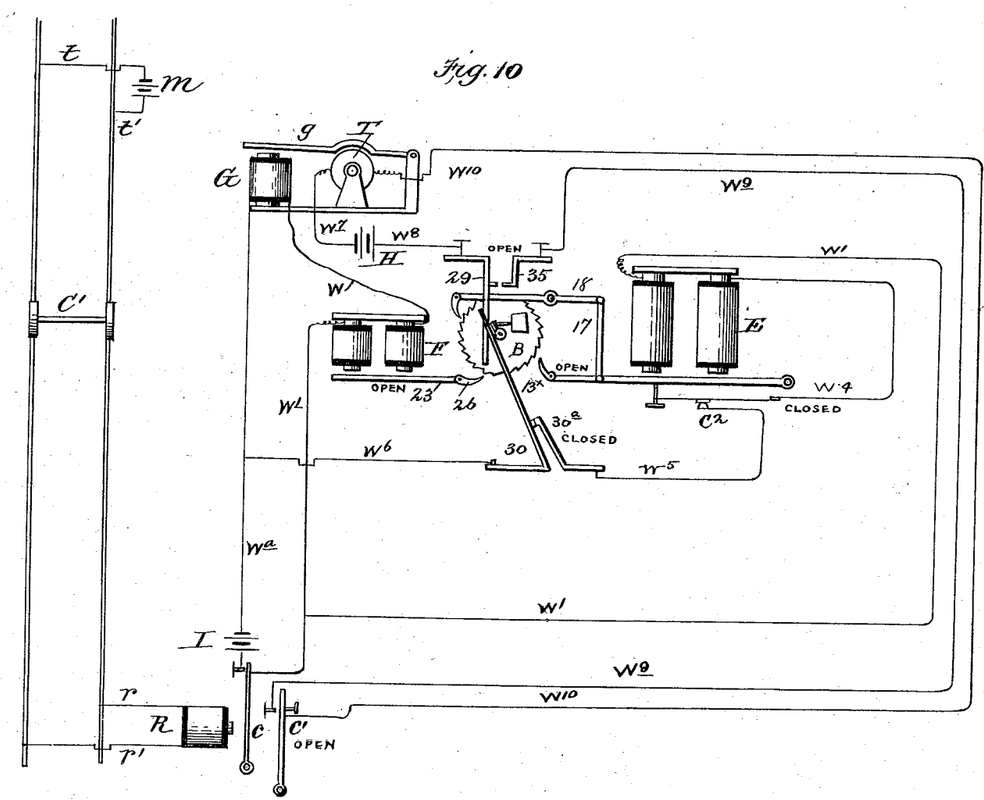
Fig. 10 is a diagrammatic view showing the relation and condition of the circuits and interposed elements and mechanism when the train is on the block or section of track and the track-battery cut out.
Figure 11:
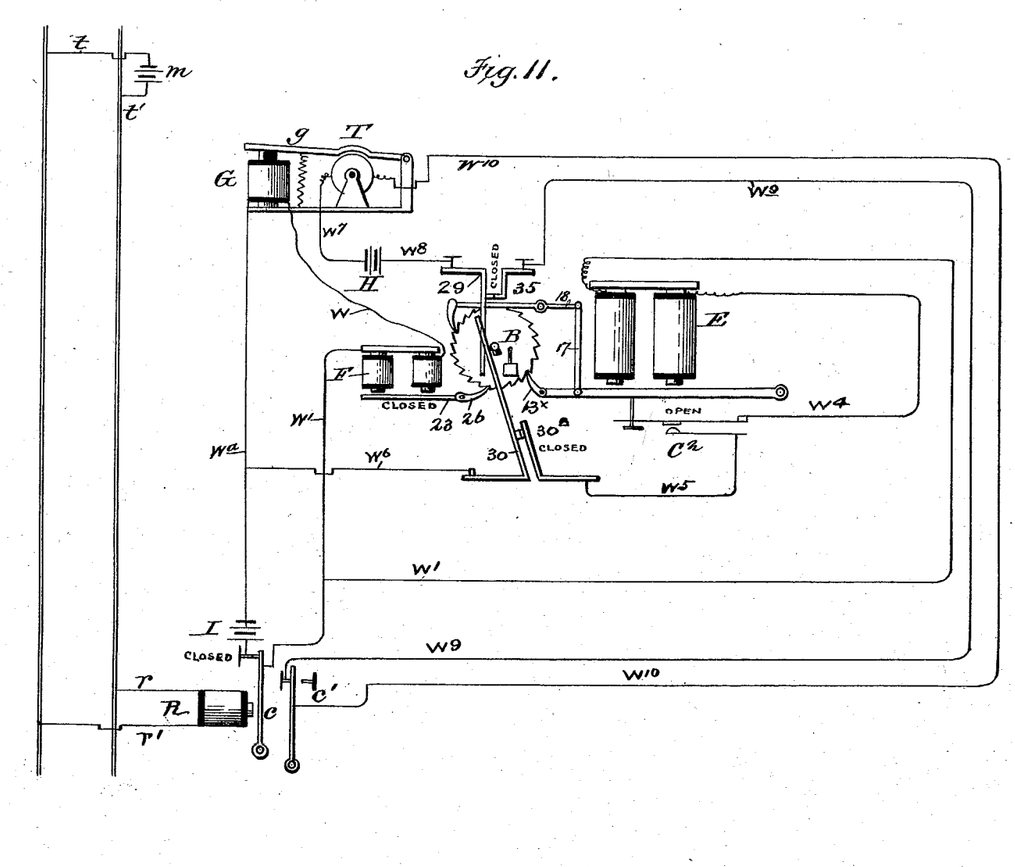
Fig. 11 is a diagrammatic view showing the relation and condition of the circuits and interposed elements and mechanism assumed after the block has just been cleared and the signal is going from "danger" to "safety."

Referring more particularly to the diagrammatic illustrations of the drawings, it will be seen that the motor-circuit is from one side of battery H to the motor T, the other side of circuit being from battery by wire $w^8$ to contacts 29 35, from latter by wire $w^9$ to relay-contact $c'$, and from thence by wire $w^{10}$ to motor. The grip and locking circuit is from relay-contact $c$, through battery I, wire $w^a$, to magnet G, from thence by wire $w$ through magnet F, and by wire $w'$ to contact of relay R. The intermittent circuit is from battery I by wire $w^a$, by wire $w^6$ to contacts 30 $30^a$, from thence by wire $w^5$ to make and break contact $c^2$, from thence by wire $w^4$ to magnet E, and from magnet E by wire $w'$ through contact to battery. The track-circuit emanates from battery M, thence by suitable connections, as $t\,t'$, to track by track-rails, thence by wires $r\,r'$ to relay R and by contacts $c\,c'$.

In Fig. 9 which indicates the normal condition of the circuits, the magnets and the interposed electrically-controlled time-circuit mechanism, the track-circuit is active, the circuit of battery I through magnet G, the armature $g$ of which locks the motor; the locking armature-pawl 26 in engagement with the time-wheel and the intermittent circuit open at contacts 30 $30^a$, with armature 20 and pawl $13^\times$ disengaged. The motor-circuit is also open at contacts 29 35, all as shown.

In Fig. 10 a train is indicated by $C'$ as having invaded the section or block of track and short-circuited the relay and the armature $c\,c'$ thus dropped from the relay, thus opening the circuits to G, F, and E, while the circuit through contacts 30 $30^a$ is in position to be restored when the train leaves the block. During this time the time-actuating mechanism is inactive, the motor-circuit being open at 29 35 and the signal in danger position.

In Fig. 11 the condition of circuits is that existing at the time the train has left the section or block of track and just as the contacts at the relay have been carried into contact therewith. The grip-circuit, the intermittent circuit, and the motor-circuit are thus immediately closed.

From the foregoing it will be readily perceived that through the instrumentality of my electrically controlled and operated time-circuit determining device I accomplish opening and closing the motor-circuit at a point therein and at a determined time and maintain it open at all times except for the short period desired while the signal is being moved from "danger" to "safety," so that should the motor-battery become deficient in force or action through repeated labor or requisition the circuit will be broken at 29 35 by the time mechanism and the motor-battery permitted to speedily accumulate its primary activity. It will also be perceived that the electrically controlled and operated time-circuit device is governed through the contacts in the circuit at the relay and two electromagnets E F, the former of which effects the progression of the time-wheel, provided with cams on its arbor to open the circuits at 29 35 and 30 $30^a$, the latter opening the circuit operating the time-wheel only.

The time-wheel magnets E are provided with the described make-and-break contacts, (designated in the diagrammatic views by $c^2$,) so that when the armature or magnet E is drawn up to the cores thereof the movement opens the circuit at $c^2$, allowing the armature to drop back, thus closing the circuit at $c^2$ and carrying back the pawl $13^\times$ one tooth on the time-wheel, and this reciprocation is repeated during the time that the motor-circuit must remain closed to operate the signal and then break the motor-circuit at the contacts therein, and at the next movement the circuit will be broken at 30 $30^a$. The lock-magnet F is controlled also by battery I through contacts of the relay actuated by the track-battery, and operates the lock-armature with pawl and holds the time-wheel against reverse movement until the train passes from the section or block, when the lock-circuit is opened and the time-wheel returns by the action of the weight thereon to normal or initial position.

The operation may be summarized as follows: The condition which the apparatus assumes and the normal relation of its circuits, elements, and mechanism are indicated in Fig. 9 of the drawings, wherein the track-circuit is active through the relay and the grip-circuit through the magnet G active to draw the armature $g$ down to lock the motor in position of holding the signal at "safety." The magnet F in the grip-circuit is active and its armature, with pawl 26, in engagement with time-wheel B. The time-circuit breaker is closed, the contacts 29 30 in the motor-circuit are open, so that the motor-circuit is inactive and the battery not exhausting, the contacts 30 $30^a$ in the time mechanism circuit are also open and the weight 11 in the position indicated, and the cams on the shaft of the time-wheel B pressing back the contacts 29 and 30 from their mates. In this condition and relative position with none but the track-circuit and the grip-circuit active when a train comes on the section of track protected by the apparatus the relay is short-circuited and its armatures released and all circuits remaining open excepting that through magnets E, which are coupled in circuit with battery I. Thus the motor-circuit is open during the time of movement of the signal (which is accomplished in the usual manner by a lever and weight) from "safety" to "danger" and remains open until the train leaves the block and the track-circuit again becomes active and returns the relay-contacts to engagement with the relay and restores the grip-circuit, and also completing the circuit through magnets E, thereby actuating the armature, with its pawl, to rotate the time-wheel (now resting with the cams on its axle in lower position) and closing the motor-circuit and time-circuit at their respective contacts, and continuing the rotation for a determined time and until the time-wheel is stopped by the lodgment of the lug 12× against the arm or stop in its path, and the cams are in their upper position, pressing the contacts 29 and 30 away from their mates and opening the circuits, and the time-wheel being locked by the pawl 26. During this rotation of the time-wheel from initial point to limit the motor for the time the circuits were closed was active and moved the signal from "danger" to "safety," and holds it in such position by reason of the grip-lever $g$ locking it against return rotation until released, which occurs when the section or block of track is again invaded and the relay again short-circuited.

What I claim is—

1. In an electrically-controlled railway-signal, the combination with the track-circuit, a relay therein, a motor to operate the signal, a motor-circuit and a time-circuit each circuit having separable contacts therein controlled by the relay, of a time-circuit mechanism in the time-circuit operated thereby and adapted to automatically break the motor-circuit at the time the motor has moved the signal from "safety" to "danger," and to return automatically the time mechanism to initial position and break the motor-circuit and the time-circuit after the track-circuit has been restored.

2. In an electrically-controlled railway-signal, a track-circuit, a relay in the track-circuit arranged to be cut out by the presence of a train on the rails within the said circuit, a motor-circuit closed and opened at the relay and having intermediate separable contacts therein, a time-circuit primarily opened and closed at the relay and having intermediate contacts to open and close the circuit, and a time mechanism operated by the time-circuit and interposed therein to break the motor-circuit and the time-circuit, and a make-and-break device in the time-circuit to impart intermittent motion to the time mechanism, substantially as described.

3. In an electrically-controlled railway-signal, a track-circuit, a relay in the track-circuit adapted to be cut out by the presence of a train on the rails within the said circuit, a motor-circuit closed and opened at the relay and having intermediate separable contacts therein, a time-circuit primarily opened and closed at the relay and having intermediate contacts to open and close the circuit, and a time mechanism operated by the time-circuit and interposed therein to open and close the motor-circuit and open and close the time-circuit and a make-and-break device in the time-circuit to impart intermittent motion to the time mechanism, substantially as described.

4. In an electrically-controlled railway-signal, a track-circuit, a relay in the track-circuit adapted to be cut out by the presence of a train on the rails within the circuit, a motor-circuit closed and opened at the relay and having intermediate separable contacts therein, a time-circuit primarily opened and closed at the relay and having intermediate contacts to open and close the circuit, a circuit make and break device in the time-circuit, and a time mechanism operated by the time-circuit, comprising electromagnets, as E, in the time-circuit, an armature for the magnets intermittingly operated by the time-circuit, a pawl on the end of the armature, a ratchet time-wheel operated by the pawl, and cams on the shaft of the time-wheel to open the contacts of the motor-circuit and the time-circuit, substantially as described.

5. In an electrically-controlled railway-signal, a track-circuit, a relay in the track-circuit adapted to be cut out by the presence of a train on the rails within the said circuit, a motor-circuit closed and opened at the relay and having intermediate separable contacts therein, a time-circuit primarily opened and closed at the relay and having intermediate contacts to open and close the circuit, a circuit make and break device in the time-circuit, and a time mechanism operated by the time-circuit, comprising electromagnets as E, in the time-circuit, an armature for the magnets intermittingly operated by the time-circuit, a pawl on the end of the armature, a ratchet time-wheel operated by the pawl, a cam on the shaft of the time-wheel to open the intermediate contacts of the motor-circuit, a second cam on the shaft of the time-wheel to open the intermediate contacts of the time-circuit and an electrically-operated pawl to lock the time-wheel in any position it may be rotated to, substantially as described.

6. In an electrically-controlled railway-signal, a track-circuit, a relay in the track-circuit adapted to be cut out by the presence of a train on the rails within the said circuit, a motor-circuit closed and opened at the relay and having intermediate separable contacts therein, a time-circuit primarily opened and closed at the relay and having intermediate contacts to open and close the circuit, a circuit make and break device in the time-circuit to impart intermittent motion to the time mechanism and a time mechanism operated by the time-circuit, comprising electromagnets as E in the time-circuit, an armature for the magnets intermittingly operated by the time-circuit, a pawl on the end of the armature, a ratchet time-wheel operated by the pawl, a cam on the shaft of the time-wheel to open the contacts of the motor-circuit, a cam on the shaft of the time-wheel to open the time-circuit, an electrically-operated pawl to lock the time-wheel in any position it may be rotated to, and a weight on the time-wheel to return it to initial point and to again open the motor-circuit and the time-circuit, substantially as described.

7. In an electrically-controlled railway-signal, a track-circuit, a relay in the track-circuit adapted to be cut out by the presence of a train on the rails within the said circuit, a motor-circuit closed and opened at the relay and having separable contacts therein, a time-circuit primarily opened and closed at the relay and having contacts to open and close the circuit, a circuit make and break device in the time-circuit and a time mechanism operated by the time-circuit, comprising electromagnets as E in the time-circuit, an armature for the magnets intermittingly operated by the time-circuit, a pawl on the end of the armature, a ratchet time-wheel operated by the pawl, cams on the arbor of the time-wheel to open the motor-circuit and the time-circuit at the respective contacts therein, a magnet F in the circuit controlled by the relay having an armature actuated thereby, and a pawl on the armature to engage and lock the ratchet-wheel against reverse movement until the track-circuit is opened, substantially as described.

8. In an electrically-controlled railway-signal, a track-circuit, a relay in the track-circuit adapted to be cut out by the presence of a train on the rails within the circuit, a motor-circuit closed and opened at the relay and having separable contacts therein, a time-circuit primarily opened and closed at the relay and having contacts to open and close the circuit, a circuit make and break device in the time-circuit and a time mechanism operated by the time-circuit, comprising electromagnets as E in the time-circuit, an armature for the magnets intermittingly operated by the time-circuit, a pawl on the end of the armature, a ratchet time-wheel operated by the pawl, cams on the arbor of the time-wheel to open the motor-circuit and the time-circuit at the respective contacts therein, a stop-pawl actuated by the time-wheel pawl, a stop ratchet-wheel C engaged by the said pawl, a magnet F in the circuit controlled by the relay, having an armature actuated thereby and a pawl on the armature to engage and lock the ratchet-wheel against reverse movement until the track-circuit is opened, substantially as described.

In testimony whereof I affix my signature in presence of two witnesses.

WILLIAM DAVES.

Witnesses:
WILLIAM WALTERS,
H. P. MASON.